United States Patent Office 3,135,787
Patented June 2, 1964

3,135,787
PROCESS FOR PRODUCING PURE SODIUM SALTS OF 5-SULFO-ISOPHTHALIC ACID AND 2-SULFO-TEREPHTHALIC ACID
Rudolf Burkhardt, Witten (Ruhr), Germany, assignor to Chemische Werke Witten, Witten (Ruhr), Germany
No Drawing. Filed Oct. 18, 1961, Ser. No. 146,012
Claims priority, application Germany Oct. 22, 1960
6 Claims. (Cl. 260—507)

The present invention relates to the production of sodium salts of 5-sulfoisophthalic acid and 2-sulfoterephthalic acid, and more particularly, to the production of the primary and secondary salts thereof by sulfonation of isophthalic and, respectively, terephthalic acid in the presence of a mercury catalyst using fuming sulfuric acid followed by neutralization of the sulfophthalic acid so produced.

Of the various possible sodium salts of 5-sulfoisophthalic acid and 2-sulfoterephthalic acid, the available literature mentions to date only the primary salts, whereas for potassium and barium secondary and tertiary salts have also been described.

In order to produce the same, one starts with the free sulfo-benzol dicarboxylic acids which are obtained, according to known processes, either by sulfonation of isophthalic acid and, respectively, terephthalic acid with fuming sulfuric acid or sulfur trioxide at temperatures of from 200 to 260° C., or by oxidation of the corresponding xylene sulfonic acids or sulfo-toluic acids, and respectively, their amides.

From the acids thus produced, the sodium salts are obtained, according to the processes generally employed for sulfonic acids and sulfocarboxylic acids, by neutralization with sodium hydroxide or sodium carbonate; by reaction with concentrated solutions of sodium salts, particularly sodium chloride, or by conversion into the earth alkali salts and their subsequent reaction with sodium carbonate. For the purpose of purification, the thus received sodium salts can be recrystallized or dissolved and reprecipitated. It is also possible to yield pure sodium salts by neutralizing pure, sulfuric acid-free sulfonic acids.

The technical production of pure sodium salts of the two sulfo-benzol dicarboxylic acids according to the known processes encounters various difficulties, both with regard to the carrying out of the sulfonation reaction, and also during the purification of the desired salts.

The sulfonation of isophthalic acid and terephthalic acid with fuming sulfuric acid requires temperatures of from 200 to 260° C. Yet, the reaction is not complete since, within this temperature range, a partial re-cleaving off of the sulfonic acid group takes place. It is necessary, therefore, to separate the non-sulfonated portions of the benzol dicarboxylic acids by diluting the sulfonation mixture with water and, upon their separation, to increase the sulfuric acid concentration again to such an extent that the sulfo-benzol dicarboxylic acids are precipitated out. When using sulfur trioxide in place of fuming sulfuric acid, higher yields are obtained, it is true, but manipulation of this sulfonation agent is difficult and requires a larger technical and material outlay, especially inasmuch as, for a better utilization of the sulfur trioxide, work is often conducted under excess pressure.

While the sulfonation of other aromatic carboxylic- and sulfonic acids and, respectively, of derivatives of these acids, such as, for example, phthalic acid anhydride, is, at different times, facilitated by the addition of catalysts, nothing is known concerning this possibility in connection with the sulfonation of isophthalic and terephthalic acids.

The sulfo-benzol dicarboxylic acids which are obtained from the sulfonation mixtures always contain small quantities of sulfuric acid and, respectively, sulfur trioxide, which change to sodium sulfate during neutralization with sodium hydroxide or sodium carbonate. In order to completely remove the same, the sodium salts of the sulfo-benzol dicarboxylic acids have to be recrystallized several times, a procedure which is not only complicated but, because of the high solubility of these salts, also a source of substantial losses. Mono-sodium salts of the sulfo-benzol dicarboxylic acids which are yielded by the reaction of the crude sulfonic acids with sodium salts by salting out (separating by the addition of salt), contain, in addition to sodium sulfate, the salt used for such salting out, for example, sodium chloride. While sodium sulfate can be removed by repeated dissolving and re-precipitating with sodium chloride, the latter must also be removed subsequently by recrystallization.

When the crude sulfo-benzol dicarboxylic acids are first converted into the sodium salts for the purpose of eliminating free sulfuric acid, only the tertiary sodium salts can be yielded therefrom by reaction with sodium carbonate; but such tertiary sodium salts must be equally purified when they are to meet higher standards of purity.

A specific purification of the sodium salts is unnecessary only if one departs from pure, sulfuric acid-free sulfo-benzol dicarboxylic acids. The purification of these acids, however, necessitates a considerable expenditure. This applies both to the purification of sulfuric acid-containing products obtained by sulfonation with fuming sulfuric acid, and to the sulfonation with sulfur trioxide and its complete removal.

It has now been found that the above-described drawbacks can be avoided and primary and secondary, pure sodium salts of 5-sulfoisophthalic acid and 2-terephthalic acid may be obtained from isophthalic acid and, respectively, terephthalic acid, in a simple manner by sulfonating isophthalic acid or terephthalic acid with fuming sulfuric acid at 120–210° C. in the presence of mercury sulfate, by separating the crude, sulfuric-acid-containing sulfo-benzol dicarboxylic acids which have been precipitated due to the dilution of the sulfonation mixture with water; by neutralizing under heat with the calculated quantity of aqueous sodium hydroxide (or carbonate) solution and precipitating the sodium salts by cooling the hot, concentrated solutions to 23–33° C., preferably to 24–26° C.; by separating at the same temperature and washing with a small amount of water and thus eliminating the formation of solid $Na_2SO_4$.

The process according to the present invention has the following advantages as compared to known processes:
(1) The sulfonation takes place at temperatures below 210° C. and is complete so that a separation of non-sulfonated portions is rendered unnecessary.
(2) The catalytic sulfonation with fuming sulfuric acid is technically much simpler than the sulfonation with sulfur trioxide or working under excess pressure.
(3) The complicated removal of the sulfuric acid still present in the crude sulfo-benzol dicarboxylic acids is no longer required since the crude sulfonic acids can be neutralized directly.
(4) The very effective and simple purification of the sodium salts renders any recrystallization and reprecipitation unnecessary.

It is, therefore, an object of the present invention to provide an improved process for the production of the primary and secondary sodium salts of 2-sulfoterephthalic acid and 5-sulfoisophthalic acid.

It is a further object of the present invention to provide a catalytic process for the production of primary and secondary sodium salts of 2-sulfoterephthalic and 5-sulfo-isophthalic acid.

Other objects of the present invention will become apparent from the further description thereof.

In carrying out the process of the present invention, isophthalic acid and, respectively, terephthalic acid, are heated with double to quadruple the amount by weight of fuming sulfuric acid, the sulfur trioxide content of which is preferably of from 20 to 30%, and with the catalyst to 120–210° C., preferably to 130–160° C. Under these conditions, the sulfonation proceeds quantitatively within a period of from 3 to 5 hours.

Mercury-II sulfate, for example, may be used as catalyst in an amount between about 1 and 2% by weight of the benzol dicarboxylic acid employed; but, as already set forth hereinabove, it is possible to also use metallic mercury, mercury oxide or other halogen-free mercury compounds in a corresponding amount.

By diluting the sulfonation mixture, the sulfo-benzol dicarboxylic acids are precipitated in crystalline form and can be separated out without difficulty. They are neutralized in aqueous solution with the amount of sodium hydroxide- or sodium carbonate-solution required for the formation of the primary or secondary salts. Any possible turbidity or discolorations may be removed by filtration under admixture of active carbon. The corresponding salts will be precipitated in crystalline form from the hot and possibly concentrated solutions. The simultaneous separation of solid sodium sulfate is prevented in that the sodium salts of the sulfo-benzol dicarboxylic acids are separated and detached at 23–33° C., the temperature range of highest solubility of the sodium sulfate. Since the solubility of the salts increases rapidly with increasing temperature, it is preferable to work at from 24 to 26° C.

When the salts are well sucked off or centrifuged, only a small amount of sodium sulfate will remain with the residues of the mother liquors to such an extent that such small amount of sodium sulfate can be substantially completely removed by a single washing operation with a little water at a temperature of 24–26° C. The sodium salts of the sulfo-benzol dicarboxylic acids obtained in uniform, well filterable crystals, can be freed from the crystal water by drying at temperatures above 110° C. Mother liquors and washing filtrates are returned to the process.

Because of their excellent water solubility, tertiary sodium salts of these two sulfo-benzol dicarboxylic acids are produced preferably by reacting already purified primary or secondary salts with the calculated quantity of sodium liquor and evaporating the resulting solutions.

The resulting sodium salts of 5-sulfoisophthalic acid and 2-sulfoterephthalic acid are valuable intermediate products and lubricant additives. Their utilization is particularly important as components in polymers of the polyester and polyamide type, for example for the production of tanning matter, ion exchangers, synthetic resins with hydrophile and, respectively, anti-static properties, and synthetic fibers with improved dye-receptivity.

The following examples serve to illustrate the present invention without, however, limiting the same.

*Example I*

7.5 g. mercury (II) sulfate and 500 g. isophthalic acid are added with stirring to 1,200 g. of fuming sulfuric acid having an anhydride content of 27%. The mixture is maintained at a temperature of about 140° C. until a sample is dissolved clear in cold water. The duration of the reaction is approximately 4 hours.

The sulfonation mixture, which has been cooled to 50° C., is then poured onto 620 g. ice or ice water. During cooling of the hot, clear solution, the sulfo-isophthalic acid crystallizes and is sucked off, or centrifuged, at a temperature of from 10 to 20° C.

The quantity of sodium hydroxide necessary for the neutralization of the SO₃H group and of the free sulfuric acid is obtained by alkalimetric titration of the crude sulfonic acid with an indicator, for example thymol blue, which changes in the pH range of 2–3 and, respectively, with electrometric indication or titration of a sample esterified by cooking for three hours with methanol. This quantity of sodium hydroxide is dissolved in the double amount by weight of water, and the resulting liquor is added slowly, while stirring, to the sulfo-isophthalic acid dissolved in half the quantity by weight of water. The reaction mixture is heated to 100° C., filtered hot and cooled slowly, while stirring, to 25° C., during which procedure the mono-sodium salt of the sulfo-isophthalic acid falls out in uniform crystals. Stirring is continued for another 30 to 60 minutes at 25° C., and the salt is subsequently sucked off or centrifuged at the same temperature.

When the salt is well dry-centrifuged, a single washing operation on the centrifuge with about 30 ml. distilled water is sufficient to remove the residual sodium sulfate. Otherwise, the salt is stirred to a paste with as little water as possible having a temperature of 25° C., sucked off again and rewashed on the filter with 15–20 ml. of distilled water. After drying at 120° C., the water-free mono-sodium salt of 5-sulfo-isophthalic acid is obtained in a yield of 400–420 g., which equals 50 to 52% of the theoretical amount. Acid number: 419.

*Example II*

500 g. isophthalic acid are sulfonated as described in Example I. Further treatment is carried out also as described in Example I, but under concomitant use of the mother liquor and washing filtrate resulting during filtration of the mono-sodium salt in the previous batch. Instead of 620 g. ice and, respectively, water, 620 g. mother liquor and 200 g. ice are used for diluting the sulfonation mixture. The washing filtrate is used concomitantly for dissolving the crude sulfo-isophthalic acid prior to neutralization. When following the further steps as described in Example I, the yield is 660 g. water-free mono-sodium salt of 5-sulfo-isophthalic acid, which yield corresponds to 82% of the theoretical amount.

*Example III*

500 g. isophthalic acid are sulfonated as described in Example I. The partial acid number—only encompassing the SO₃H group and the free sulfuric acid—is determined for the crude sulfo-isophthalic acid as indicated in Example I and subsequently the total acid number is determined. The difference between the two acid numbers indicates the alkali need of the two carboxylic groups. For producing the di-sodium salt of the sulfo-isophthalic acid, a quantity of sodium hydroxide corresponding to the partial acid number and half of the difference between both acid numbers is thus needed. This amount of sodium hydroxide is dissolved to form a 40% soda lye solution and the solution of the crude sulfo-isophthalic acid is neutralized therewith in half the amount by weight of water. The reaction mixture, heated to 90–100° C., is filtered hot upon addition of 2–3 g. active carbon; cooled while stirring to 25° C., and stirring is continued at that temperature for another 60 minutes. The salt is sucked off, washed with about 200 ml. water, sucked off again and washed once more on the filter with 10–20 ml. water. After drying at 120° C., the yield of di-sodium salt of 5-sulfo-isophthalic acid is 455 g., which corresponds to 52.3% of the theoretical amount.

*Example III–A*

When the mother liquors and washing filtrates are concomitantly used, as indicated in Example II, the yield increases to about 80% of the theory.

*Example IV*

7.5 HgO and 500 g. terephthalic acid are added, while stirring, to 1,800 g. fuming sulfuric acid having 27% SO₃. This mixture is maintained at a temperature of between 150 and 155° C. until a sample dissolves clear in cold water, which requires from 4 to 5 hours. The sulfonation mixture is cooled to 50° C. and slowly tempered in 1.5 liters ice water. The sulfoterephthalic acid begins at once to fall out. The mixture is cooled, while stirring, to room temperature, and the crude sulfonic acid is separated by suction or by centrifuging. The quantity of sodium hydroxide required for forming the di-sodium salt is calculated in the manner described in Example III above, dissolved in water to form a 25% soda lye solution, and the 50% aqueous solution of the crude sulfo-terephthalic acid is neutralized therewith. The reaction mixture is heated to approximately 100° C. upon addition of 2–3 g. active carbon, the hot solution is filtered, cooled while stirring to 25° C., and stirring is continued for another 60 minutes at that same temperature. The resulting salt is sucked off, then mixed to a paste with as little water as possible; sucked off again and rewashed on the filter with 10–20 ml. water. After drying at 120° C., the water-free di-sodium salt of the sulfo-terephthalic acid is obtained with a yield of 710 g., corresponding to 81.3% of the theoretical amount.

*Example V*

3,600 g. fuming sulfuric acid having 27% $SO_3$, 10 g. of metallic mercury and 1,000 g. of terephthalic acid are heated, while stirring, to 150–155° C. and maintained at that temperature for 5 hours. Thereupon the sulfonation mixture is cooled to 40–50° C., and a mixture of 1 kg. ice and 2 liters water is stirred in. The sulfoterephthalic acid which is precipitated during cooling in crystalline form is centrifuged, water is absorbed in the same amount by weight, approximately 1,700–1,800 g., and bleached by stirring for 30 minutes with 10 g. of active carbon at 50° C. The amount of sodium hydroxide required for neutralizing the sulfonic acid group and the free sulfuric acid, which amount has been found by alkalimetric titration of a sample until the first change of thymol blue is added slowly to the filtered solution with stirring. The sodium hydroxide is in the form of a 25% soda lye solution. While stirring constantly, the mixture is then cooled to 25° C.; stirring is continued at that temperature for another 45 minutes, then the precipitated salt is centrifuged rigorously and washed on the centrifuge with 100 ml. of distilled water. After drying at 120° C., 1,225–1,240 g. of water-free monosodium salt of 2-sulfoterephthalic acid (=76–77% of the theoretic yield) are obtained. The product has the acid number 419 and is free from sodium sulfate.

While the invention has been described with reference to a number of examples thereof, it will be understood that changes may be made in carrying out the process without departing from the scope of the invention, and it is intended that all matter contained in the above description shall be interpreted as illustrative and not in a limiting sense.

I claim:

1. A process for producing a desired pure sodium salt of a sulfobenzol dicarboxylic acid selected from the group consisting of the mono- and di-sodium salts of 5-sulfo-isophthalic acid and 2-sulfoterephthalic acid, comprising sulfonating an acid selected from the group consisting of isophthalic acid and terephthalic acid with fuming sulfuric acid at a temperature between approximately 120° and 210° C. in the presence of a catalyst selected from the group consisting of mercury and halogen-free mercury compounds, separating the resulting crude sulfobenzol dicarboxylic acid from the sulfonation mixture, partially neutralizing said crude sulfobenzol dicarboxylic acid containing sulfuric acid by the addition of a predetermined amount of a sodium compound selected from the group consisting of sodium hydroxide and sodium carbonate in aqueous solution to form sodium sulfate and said desired sodium salt, said predetermined amount of said sodium compound being the amount required for the conversion of said sulfobenzol dicarboxylic acid into said desired sodium salt, cooling the resulting hot solution of said neutralization to a temperature between 23 and 33° C. to precipitate said desired sodium salt of the sulfobenzol dicarboxylic acid, and thereafter separating said desired sodium salt from the sodium sulfate resting in solution at said last-mentioned temperature.

2. A process for producing a desired pure sodium salt of a sulfobenzol dicarboxylic acid selected from the group consisting of the mono- and di-sodium salts of 5-sulfo-isophthalic acid and 2-sulfo-terephthalic acid, comprising sulfonating an acid selected from the group consisting of isophthalic acid and terephthalic acid with fuming sulfuric acid containing 20 to 30% $SO_3$ at a temperature between approximately 120° and 210° C. in the presence of between approximately 1 and 2% by weight of a catalyst selected from the group consisting of mercury and halogen-free mercury compounds, said sulfuric acid being used in amounts between approximately double and quadruple the amount by weight of said dicarboxylic acid, separating the resulting crude sulfobenzol dicarboxylic acid from the sulfonation mixture, partially neutralizing said crude sulfobenzol dicarboxylic acid containing sulfuric acid by the addition of a predetermined amount of a sodium compound selected from the group consisting of sodium hydroxide and sodium carbonate in aqueous solution to form sodium sulfate and said desired sodium salt, said predetermined amount of said sodium compound being the amount required for the conversion of said sulfobenzol dicarboxylic acid into said desired sodium salt, cooling the resulting hot solution of said neutralization to a temperature between 23 and 33° C. to precipitate said desired sodium salt of the sulfobenzol dicarboxylic acid, and thereafter separating said desired sodium salt from the sodium sulfate resting in solution at said last-mentioned temperature.

3. A process for producing a desired pure sodium salt of a sulfobenzol dicarboxylic acid selected from the group consisting of the mono- and di-sodium salts of 5-sulfo-isophthalic acid and 2-sulfo-terephthalic acid, comprising sulfonating an acid selected from the group consisting of isophthalic acid and terephthalic acid with fuming sulfuric acid at a temperature between approximately 130° and 160° C. in the presence of a catalyst selected from the group consisting of mercury and halogen-free mercury compounds, separating the resulting crude sulfobenzol dicarboxylic acid from the sulfonation mixture, partially neutralizing said crude sulfobenzol dicarboxylic acid containing sulfuric acid by the addition of a predetermined amount of a sodium compound selected from the group consisting of sodium hydroxide and sodium carbonate in aqueous solution to form sodium sulfate and said desired sodium salt, said predetermined amount of said sodium compound being the amount required for the conversion of said sulfobenzol dicarboxylic acid into said desired sodium salt, cooling the resulting hot solution of said neutralization to a temperature between 24 and 26° C. to precipitate said desired sodium salt of the sulfobenzol dicarboxylic acid, and thereafter separating said desired sodium salt from the sodium sulfate resting in solution and washing the same at said last-mentioned temperature.

4. A process for producing a desired pure sodium salt of a sulfobenzol dicarboxylic acid selected from the group consisting of the mono- and di-sodium salts of 5-sulfo-isophthalic acid and 2-sulfo-terephthalic acid, comprising sulfonating an acid selected from the group consisting of isophthalic acid and terephthalic acid with fuming sulfuric acid at a temperature between approximately 120° and 210° C. in the presence of a catalyst selected from the group consisting of mercury and halogen-free mercury compounds, cooling the sulfonation mixture and adding water thereto to precipitate the resulting crude sulfobenzol dicarboxylic acid and form a 50 to 75% concentrated sulfuric acid solution, separating the crude sulfobenzol dicarboxylic acid containing sulfuric acid impurities, partially neutralizing said crude sulfobenzol dicarboxylic acid containing sulfuric acid by the addition of a predetermined amount of a sodium compound selected from the group consisting of sodium hydroxide and sodium carbonate in aqueous solution to form sodium sulfate and said desired sodium salt, said predetermined amount of said sodium compound being the amount required for the conversion of said sulfobenzol dicarboxylic acid into said desired sodium salt, cooling the resulting hot solution of said neutralization to a temperature between 23 and 33° C. to precipitate said desired sodium salt of the sulfobenzol dicarboxylic acid, and thereafter separating said desired sodium salt from the sodium sulfate resting in solution at said last-mentioned temperature.

5. A process for producing a desired pure sodium salt of a sulfobenzol dicarboxylic acid selected from the group consisting of the mono- and di-sodium salts of 5-sulfo-isophthalic acid and 2-sulfo-terephthalic acid, comprising sulfonating an acid selected from the group consisting of isophthalic acid and terephthalic acid with fuming sulfuric acid at a temperature between approximately 120° and 210° C. in the presence of a catalyst selected from the group consisting of mercury and halogen-free mercury compounds, separating the resulting crude sulfobenzol dicarboxylic acid from the sulfonation mixture, partially neutralizing said crude sulfobenzol dicarboxylic acid containing sulfuric acid by the addition of a predetermined amount of a sodium compound selected from the group consisting of sodium hydroxide and sodium carbonate in aqueous solution to form sodium sulfate and said desired sodium salt, said predetermined amount of said sodium compound being the amount required for the conversion of said sulfobenzol dicarboxylic acid into said desired sodium salt, cooling the resulting hot solution of said neutralization to a temperature between 23 and 33° C. to precipitate said desired sodium salt of the sulfobenzol dicarboxylic acid, and thereafter filtering out said desired sodium salt from the sodium sulfate resting in solution and washing the same at said last-mentioned temperature, the mother liquor and washing filtrate resulting during filtration of the desired sodium salt being returned to the process.

6. A process for producing a desired pure sodium salt of a sulfobenzol dicarboxylic acid selected from the group consisting of the mono- and di-sodium salts of 5-sulfo-isophthalic acid and 2-sulfo-terephthalic acid, consisting of sulfonating an acid selected from the group consisting of isophthalic acid and terephthalic acid with fuming sulfuric acid containing 20 to 30% $SO_3$ at a temperature between approximately 120° to 210° C. in the presence of between approximately 1 and 2% by weight of a catalyst selected from the group consisting of mercury and halogen-free mercury compounds, said sulfuric acid being used in amounts between approximately double and quadruple the amount by weight of said dicarboxylic acid, cooling the sulfonation mixture and adding water thereto to precipitate the resulting crude sulfobenzol dicarboxylic acid and form a 50 to 75% concentrated sulfuric acid solution, separating the crude sulfobenzol dicarboxylic acid containing sulfuric acid impurities, dissolving said crude sulfobenzol dicarboxylic acid in water, partially neutralizing said crude sulfobenzol dicarboxylic acid containing sulfuric acid solution by the addition of a predetermined amount of a sodium compound selected from the group consisting of sodium hydroxide and sodium carbonate in aqueous solution to form sodium sulfate and said desired sodium salt, said predetermined amount of said sodium compound being the amount required for the conversion of said sulfobenzol dicarboxylic acid into said desired sodium salt, cooling the resulting hot solution of said neutralization to a temperature between 23 and 33° C. to precipitate said desired sodium salt of the sulfobenzol dicarboxylic acid, and thereafter separating said desired sodium salt from the sodium sulfate resting in solution at said last-mentioned temperature.

References Cited in the file of this patent
UNITED STATES PATENTS
1,745,025    Mildner _____ Jan. 28, 1930

OTHER REFERENCES
Heine: Ber. Deut. Chem., vol. 13, 494 (1880).